(12) United States Patent     (10) Patent No.: US 7,904,447 B1
Russell et al.                         (45) Date of Patent:    Mar. 8, 2011

(54) METHOD AND SYSTEM FOR DIRECTING LOCAL DATA ACCESS FROM A REMOTE SYSTEM

(75) Inventors: Kent S. Russell, Orem, UT (US); Mark Richard Tyler, Orem, UT (US); Bradley Gary Keck, Lehi, UT (US); Wei Wang, Fremont, CA (US); Louis Francisco daRosa, Jr., Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 462 days.

(21) Appl. No.: 12/018,075

(22) Filed: Jan. 22, 2008

(51) Int. Cl.
     *G06F 17/30*         (2006.01)

(52) U.S. Cl. ......... 707/716; 707/705; 707/713; 707/726; 707/E17.031; 707/E17.032; 707/999.001; 707/999.1; 707/999.205

(58) Field of Classification Search ................. None
See application file for complete search history.

(56) References Cited

U.S. PATENT DOCUMENTS

| | | | |
|---|---|---|---|
| 7,424,592 B1 * | 9/2008 | Karr et al. | 711/203 |
| 7,567,973 B1 * | 7/2009 | Burrows et al. | 1/1 |
| 7,702,761 B1 * | 4/2010 | Reid | 709/223 |
| 2006/0020646 A1 * | 1/2006 | Tee et al. | 707/205 |
| 2007/0061327 A1 * | 3/2007 | Oscherov et al. | 707/10 |

* cited by examiner

*Primary Examiner* — Don Wong
*Assistant Examiner* — Andalib F Lodhi
(74) *Attorney, Agent, or Firm* — Osha • Liang LLP

(57) ABSTRACT

The invention relates to a method for directing data access in a local system. The method includes steps of obtaining sharing metadata from the local system by a remote application, wherein the sharing metadata comprises local access path information for accessing a shared data resource associated with the local system, generating, by the remote application, a local access path for the shared data resource from the local access path information, requesting, by the remote application, that a data access application on the local system perform a data operation on the shared data resource, wherein the remote application provides the local access path to the data access application, and receiving the result of the data operation from the data access application, wherein the data access application performs the data operation on the shared data resource using the local access path.

24 Claims, 5 Drawing Sheets

METHOD AND SYSTEM FOR DIRECTING LOCAL DATA ACCESS FROM A REMOTE SYSTEM

BACKGROUND

A heterogeneous computing environment, for example, an enterprise network of a large corporation, typically contains multiple computer systems, operating systems, file systems, protocols, and network architectures that are designed, manufactured, installed, or configured differently. These various elements may cooperate to allow enterprise hardware and software resources to be shared by multiple computer systems. In a typical example, each data storage device implements a particular file system, meaning that for different types of storage devices and for storage devices managed by diverse file server platforms, many different (and possibly incompatible) file systems are present.

Examples of file systems and file server platforms used in an enterprise network include the WINDOWS® operating system and the Common Internet File System (CIFS) developed by Microsoft Corporation of Redmond, Wash., the NetWare® Core Protocol (NCP) developed by Novell, Inc., Orem, Utah, the UNIX-based Network File System (NFS) developed by Sun Microsystems, the UNIX-like open source LINUX® operating system supported by various corporations, etc. Windows is a registered trademark of Microsoft Corporation. NetWare is a registered trademark of Novell, Inc. Linux is a registered trademark of Linus Torvalds. Further, given the explosive growth of the Internet and its powerful resource sharing capabilities, it is now typical for many file servers, to run both HyperText Transfer Protocol (HTTP) server software to service requests received from the Internet, and to run NFS, CIFS, NCP, or LINUX server software to service requests received from a local network.

In the heterogeneous computing environment, a server managing shared data resources (e.g., a file, database table or record) may be referred to as a local system while a client system accessing the shared data resources may be referred to as a remote system. A storage device storing the shared data resources may be part of the server, physically separated from the server, or logically accessible or otherwise known to the server. The server, or local system, may support two distinct resource access paths to the shared data resources—a local access path for local access from an application installed on the local system and a remote access path for remote access from a remote system.

A local access path may be, for example, the general form of a file or directory name, giving the name of the file and the unique location of the file in a file system. A remote access path may be implemented using standard schemes for network sharing of data resources. For example, a remote access path may conform to the Universal Naming Convention or Uniform Naming Convention (UNC) which specifies a common syntax to describe the location of a network resource, such as a shared file, directory, or printer. Accordingly, a remote system may obtain access to a particular data resource of the local system using the UNC without having to obtain details of the local access path. When the remote system accesses a data resource of a local system using a remote access path, the response time for accessing the data resource may be longer than a local access to the data resource as this remote access path is typically translated into a local access path in order to access the data resource.

SUMMARY

In general, in one aspect, the invention relates to a method for directing data access in a local system. The method includes steps of obtaining sharing metadata from the local system by a remote application, wherein the sharing metadata comprises local access path information for accessing a shared data resource associated with the local system, generating, by the remote application, a local access path for the shared data resource from the local access path information, requesting, by the remote application, that a data access application on the local system perform a data operation on the shared data resource, wherein the remote application provides the local access path to the data access application, and receiving the result of the data operation from the data access application, wherein the data access application performs the data operation on the shared data resource using the local access path.

In general, in one aspect, the invention relates to a method for directing data access in a local system. The method includes steps of providing sharing metadata to a remote application, wherein the sharing metadata comprises local access path information for a shared data resource associated with the local system, receiving, from the remote application, a request to perform a data operation on the shared data resource, wherein the request comprises a local access path for the shared data resource generated from the local access path information, performing the data operation on the shared data resource using the local access path, and providing the result of the data operation to the remote application.

In general, in one aspect, the invention relates to a system for directing data access in a local system by a remote system. The system includes a remote application on the remote system, a shared data resource stored on the local system, wherein the shared data resource is shared by the remote application, a sharing metadata comprising local access path information associated with the shared data resource, and a data access application on the local system, wherein the data access application is operatively connected to the shared data resource to perform a plurality of data operations, wherein the remote application is configured to obtain the sharing metadata from the local system, generate a local access path for the shared data resource from the local access path information, request that the data access application perform a data operation of the plurality of data operations on the shared data resource, wherein the remote application provides the local access path to the data access application, and receive the result of the data operation from the data access application, and wherein the data access application is configured to perform the data operation on the shared data resource using the local access path.

In general, in one aspect, the invention relates to a computer readable medium including executable instructions to obtain sharing metadata from a local system by a remote application wherein the sharing metadata comprises local access path information for accessing a shared data resource associated with the local system, generate, by the remote application, a local access path for the shared data resource from the local access path information, request, by the remote application, that a data access application on the local system perform a data operation on the shared data resource, wherein the remote application provides the local access path to the data access application, and receive the result of the data operation from the data access application, wherein the data access application performs the data operation on the shared data resource using the local access path.

In general, in one aspect, the invention relates to a computer readable medium including executable instructions to provide sharing metadata to a remote application, wherein the sharing metadata comprises local access path information for a shared data resource associated with a local system, receive, from the remote application, a request to perform a data operation on the shared data resource, wherein the request comprises a local access path for the shared data resource generated from the local access path information, perform the data operation on the shared data resource using the local access path, and provide the result of the data operation to the remote application.

Other aspects of the invention will be apparent from the following description and the appended claims.

DETAILED DESCRIPTION

Figure 1:
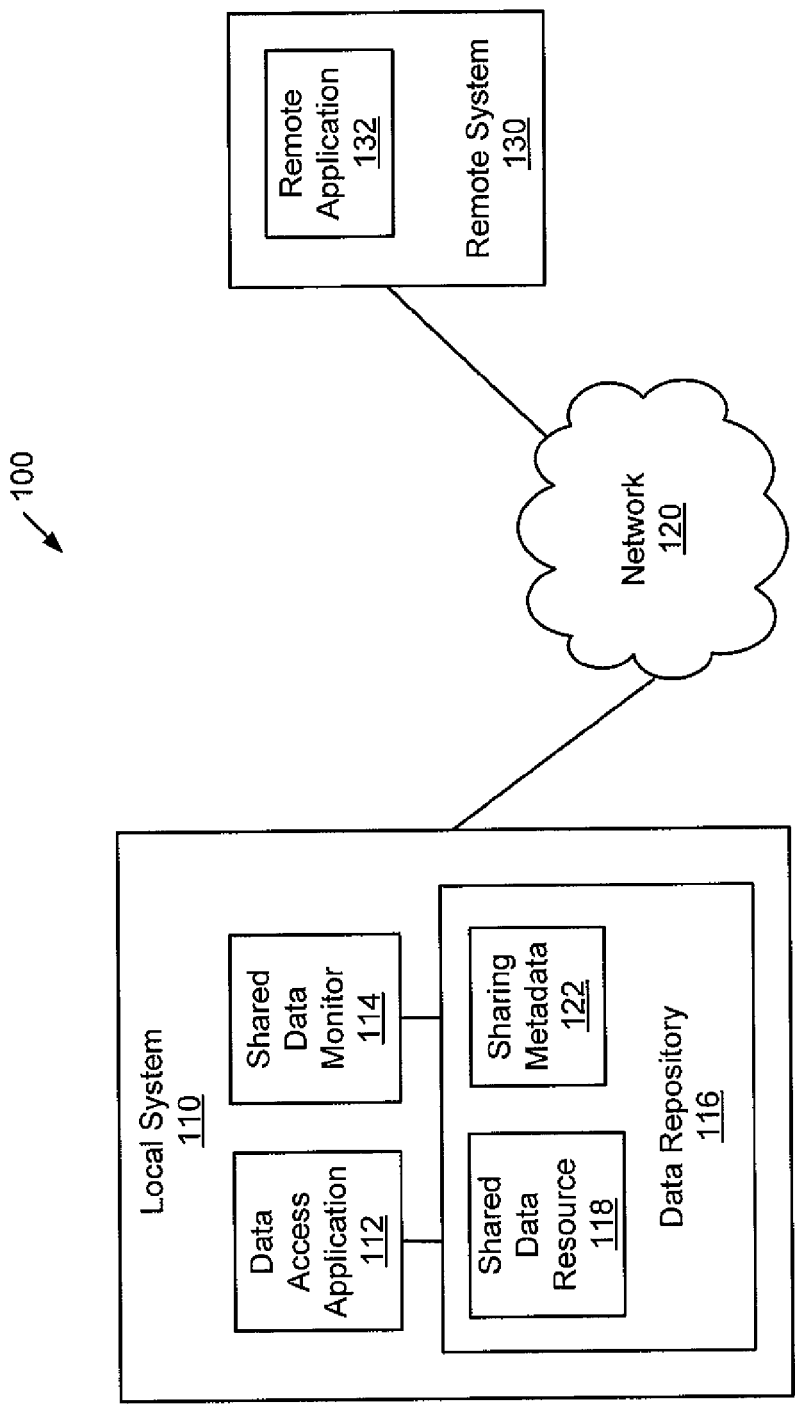
FIG. 1 shows a diagram of a system for directing local data access from a remote system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide methods and systems for directing local data access from a remote system. More specifically, in one or more embodiments of the invention, an application executing on a remote system (i.e., a remote application) can request access to a shared data resource managed by a local system using local access path information rather than remote access path information. A shared data monitor executing on the local system monitors the sharing of data resources managed by the local system with remote applications and associates metadata (i.e., sharing metadata) with each shared data resource. The sharing metadata, which includes the local access path information for a shared data resource, is stored by the local system, and the remote application can obtain the sharing metadata using a remote access path for the sharing metadata. When the remote application needs to request data operations on the shared data resource, the remote application obtains the sharing metadata for the shared data resource from the local system, and requests the data operations using the local access path information in the sharing metadata.

FIG. 1 shows a system (100) for directing local data access from a remote system in accordance with one or more embodiments of the invention. The system (100) includes a local system (110) and a remote system (130) communicatively coupled by a network (120). In one or more embodiments of the invention, the network (120) may be a wide area network (WAN) such as the Internet, a wireless network, a local area network (LAN), or a combination of networks.

The local system (110) and the remote system (130) may each be a server, a cluster of servers, a desktop computer, a laptop computer, a mobile device (e.g., a cell phone or personal digital assistant), or any other computing system suitable for hosting the functionality described herein. Further, the local system (110) and the remote system (130) may be configured with different system software (e.g., operating systems and file systems).

The local system (110) includes a data repository (116), a shared data monitor (114), and a data access application (112). In one or more embodiments of the invention, the data repository (116) may be, for example, a database, a file system, one or more data structures configured in the memory of the local system (110), an extensible markup language (XML) file, a text file, a spreadsheet, any other type of data repository, or a suitable combination thereof. In one or more embodiments, the data repository (116) is stored in a data server (not shown) communicatively coupled with the local system (110).

The data repository (116) stores one more data resources (e.g., shared data resource (118)) that may be shared by applications on remote systems (e.g., remote application (132) on remote system (130)). In one or more embodiments of the invention, a shared data resource may be a file, a database, any other type of data that may be both locally and remotely addressable, or a suitable combination thereof. The data repository (116) also stores sharing metadata (e.g., sharing metadata (122)) for each data resource (e.g., shared data resource (118)) that is shared with a remote application. Sharing metadata is discussed in more detail below in relation to the description of the shared data monitor (114).

The data access application (112) may be a standalone end-user application (e.g., a financial application, an accounting application, a bookkeeping application, a payroll application, a spreadsheet application, a business application, or any other end-user application that may manage and supply data), a database management system, a file system, a hosted service (e.g., a web service or any other type of backend service), an execution thread in a stand-alone end-user application, any other type of service, or any combination thereof. In one or more embodiments of the invention, the data access application (112) includes functionality to receive and process requests from the remote application (132) related to the shared data resource (118). Further, in some embodiments of the invention, the data access application (112) includes functionality to access the shared data resource (118) using either a local access path or a remote access path.

More specifically, in one or more embodiments of the invention, the data access application (112) includes functionality to receive requests from the remote application (132) via the network (120) to perform data operations relating to the shared data resource (118) and to provide the results of the data operations to the remote application (132). In some embodiments of the invention, a data operation may be file based and may include creating, reading, writing, copying, renaming a file or directory, or any other file operation. Further, in some embodiments of the invention, a data operation may be a database operation (e.g., a database query, writing to a table or record in a database, or any other database operation). Further, in one or more embodiments of the invention, the data access application (112) includes functionality to perform processing operations on data retrieved from or written to the shared data resource (118) at the request of the remote application (132). The processing operations may include a "database unload" or "database export" operation where all data in a database is read and dumped to an external file with the status returned to the remote application (132).

The requests from the remote application (132) include local access path information for the shared data resource (118). The data access application (112) is further configured to use the local access path information provided by the remote application (132) to perform the requested data operation. In one or more embodiments of the invention, the local access path information includes a local access path for the shared data resource (118). For example, the local access path may be a local pathname for a file or a directory in a file system. In some embodiments of the invention, the local access path information may include security information (e.g., a password or an encryption key) required to access the shared data resource (118).

In one or more embodiments of the invention, the shared data monitor (114) includes functionality to detect data resources (e.g., shared data resource (118)) that are shared with remote applications (e.g., remote application (132)). The shared data monitor (114) includes further functionality to create metadata to support the sharing (e.g., sharing metadata (122)) for each shared data resource and to store the metadata in the data repository (116) in association with the corresponding shared data resource (e.g., shared data resource (118)). In addition, the shared data monitor (114) includes functionality to provide information needed to access the metadata (e.g., sharing metadata (122)) for a shared data resource (e.g., shared data resource (118)) to any remote applications (e.g., remote application (132)) that share the data resource. In one or more embodiments of the invention, the information needed to access the metadata may be a remote access path for the metadata. For example, the information needed to access the metadata may be a UNC pathname for a file storing the metadata.

The metadata (e.g., sharing metadata (122)) includes information needed by a remote application (e.g., remote application (132)) to direct a local application (e.g., data access application (112)) to access a shared data resource (e.g., shared data resource (118)) as a local resource rather than as a network resource. More specifically, the metadata (e.g., sharing metadata (122)) includes the local access path information for a shared data resource (e.g., shared data resource (118)).

In one or more embodiments of the invention, the shared data monitor (114) includes functionality to periodically search for data resources (e.g., shared data resource (118)) designated to be shared with remote applications (e.g., remote application (132)). In some embodiments of the invention, the shared data monitor (215) is configured to monitor for the creation of shared data resources (e.g., shared data resource (118)) in the local system (110) such that the metadata (e.g., sharing metadata (122)) may be created when the shared data resource is created (e.g., shared data resource (118)).

The remote system (130) includes a remote application (132). The remote application (132) may be a standalone end-user application (e.g., a financial application, an accounting application, a bookkeeping application, a payroll application, a spreadsheet application, a business application, or any other end-user application that may use data stored by another system (e.g., local system (110)), a hosted service (e.g., a web service or any other type of backend service), an execution thread in a stand-alone end-user application, any other type of service, or any combination thereof.

The remote application (132) includes functionality to request that the data access application (112) perform data operations in relation to a shared data resource (e.g., shared data resource (118)) and to receive the results of those data operations from the data access application (112). More specifically, the remote application (132) includes functionality to identify a shared data resource (e.g., shared data resource (118)) to be accessed, to obtain the metadata (e.g., sharing metadata (122)) associated with the shared data resource from the local system (110), to extract the local access path information from the metadata, and to request any desired data operations on the shared data resource (e.g., shared data resource (118)) from the data access application using the local access path information. Thus, the remote application (132) may direct the data access application (112) to access a shared data resource (e.g., shared data resource (118)) as a local resource rather than as a network resource.

In one or more embodiments of the invention, the remote application (132) obtains the metadata (e.g., sharing metadata (122)) for a shared data resource (e.g., shared data resource (118)) from the local system (110) using a remote access path (e.g., a UNC pathname) provided by the shared data monitor (114). Further, in some embodiments of the invention, the remote application (132) includes functionality to allow a user of the remote application (132) to access a shared data resource (e.g., shared data resource (118)) as if the resource where a file system even when the resource is not a file system. More specifically, a user may access a shared data resource (e.g., shared data resource (118)) that is something other than a file system (e.g., a database) using a file system metaphor. For example, the remote application (132) may provide appropriately formatted local access path information from the metadata (e.g., sharing metadata (122)) for a shared data resource (e.g., shared data resource (118)) in a file open dialog box to a user for selection. The selected local access path information may then be provided to the data access application (112) to identify the shared data resource (e.g., shared data resource (118)). Further, the remote application (132) may include functionality to display data from the shared data resource (118) as if the data came from a file.

Figure 2A:
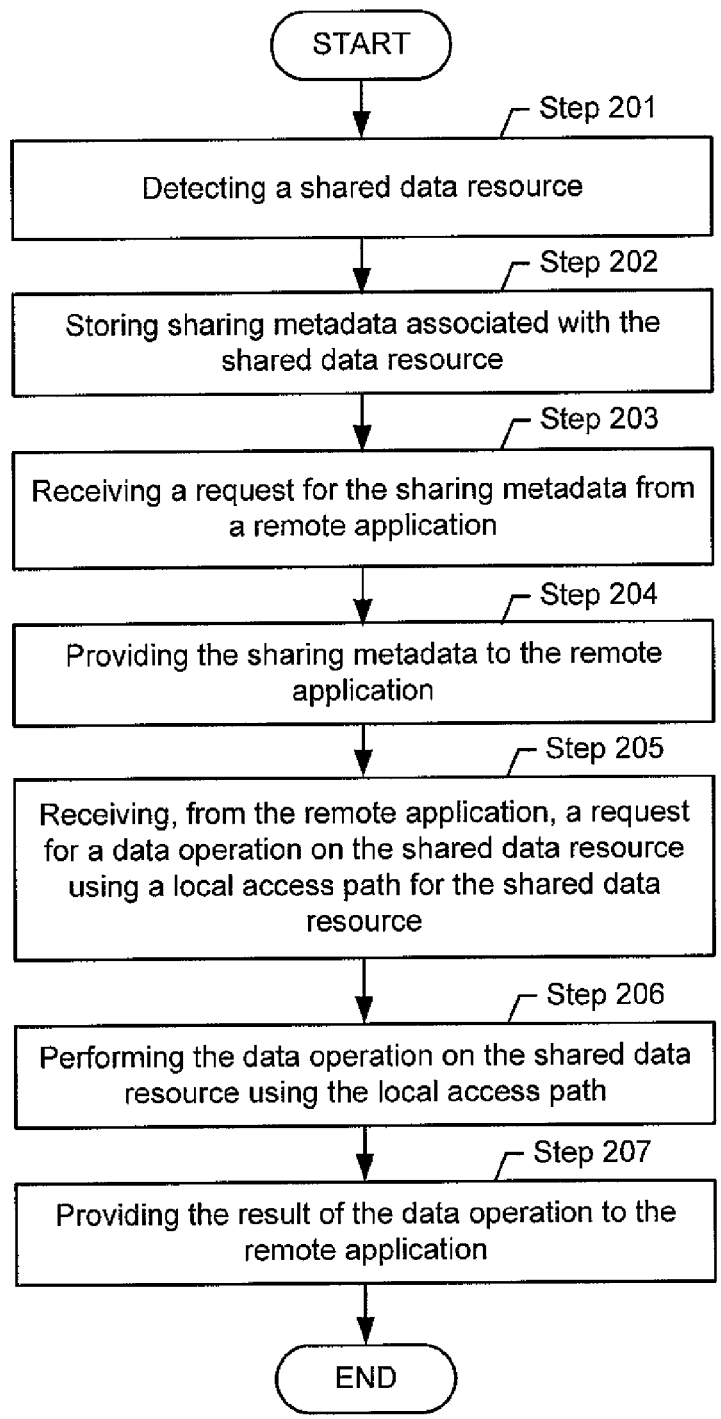
FIGS. 2A and 2B show flow charts of methods for directing local data access from a remote system in accordance with one or more embodiments of the invention.
Figure 2B:
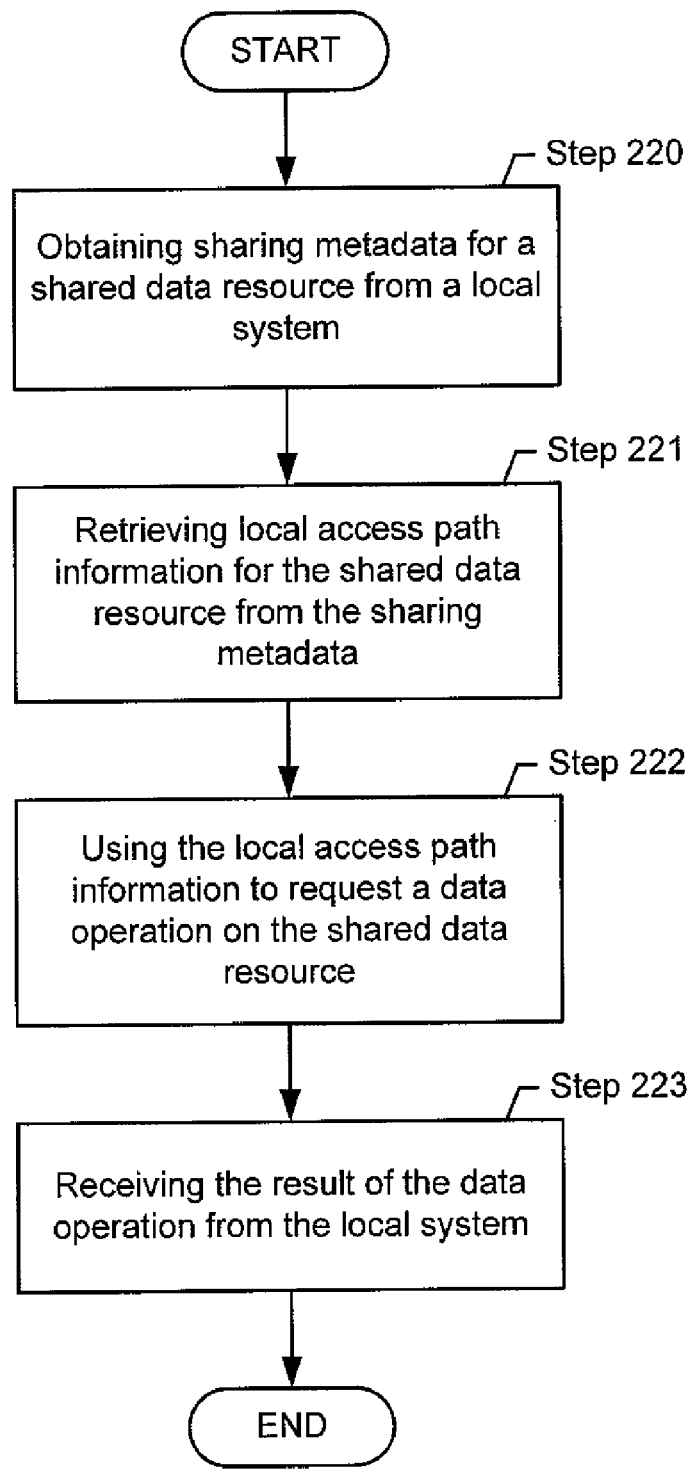

FIGS. 2A and 2B show flow charts of methods for directing local data access from a remote system in accordance with one or more embodiments of the invention. In one or more embodiments of the invention, one or more of the steps shown in FIGS. 2A and 2B may be omitted, repeated, performed in parallel, and/or performed in a different order. Accordingly, the specific arrangement of steps shown in FIGS. 2A and 2B should not be construed as limiting the scope of the invention.

FIG. 2A shows a method for directing local data access from a remote system from the viewpoint of a local system. As shown in FIG. 2A, initially, a shared data resource (e.g., shared data resource (118) of FIG. 1) may be detected (e.g., by a shared data monitor (114) of FIG. 1) (Step 201). In some embodiments of the invention, the detection may be accomplished by scanning a data repository (e.g., data repository (116) of FIG. 1) for shared data resources. In some embodiments of the invention, the detection may be accomplished by monitoring the creation of shared data resources or the designation of a data resource to be shared. Local access path information for the detected shared data resource may then be stored as sharing metadata for the shared data resource (Step 202). For example, the local access path information may be stored in a metadata file associated with the shared data resource. In addition, a remote access path (e.g., a UNC pathname) for the sharing metadata may be provided to any remote applications that share the data resource.

Subsequently, a request for the sharing metadata may be received from a remote application (Step 203) and the sharing metadata is provided to the remote application (Step 204). For example, the remote application may use the remote access path to request the sharing metadata. The remote application may then request a data operation on the shared data resource using the local access path information for the shared data resource from the sharing metadata (Step 205). For example, the remote application may extract a local access path for the shared data resource from the local access path information and provide that local access path as a part of the request. The requested data operation is performed on the shared data resource using the local access path information (Step 206) and the result of the data operation is returned to the remote application (Step 207).

FIG. 2B shows a method for directing local data access from a remote system from the viewpoint of the remote system. As shown in FIG. 2B, initially, sharing metadata for a shared data resource is obtained from a local system (Step 220). The local access path information for the shared data resource may then be retrieved from the sharing metadata (Step 221). The retrieved local access path information may then be used to request a data operation on the shared data resource (Step 222). For example, the remote application may request that a data access application on the local system perform a data operation on the shared data resource and may provide the local access path information as a part of the request. The result of the requested data operation is then received from the local system (Step 223).

Figure 3:
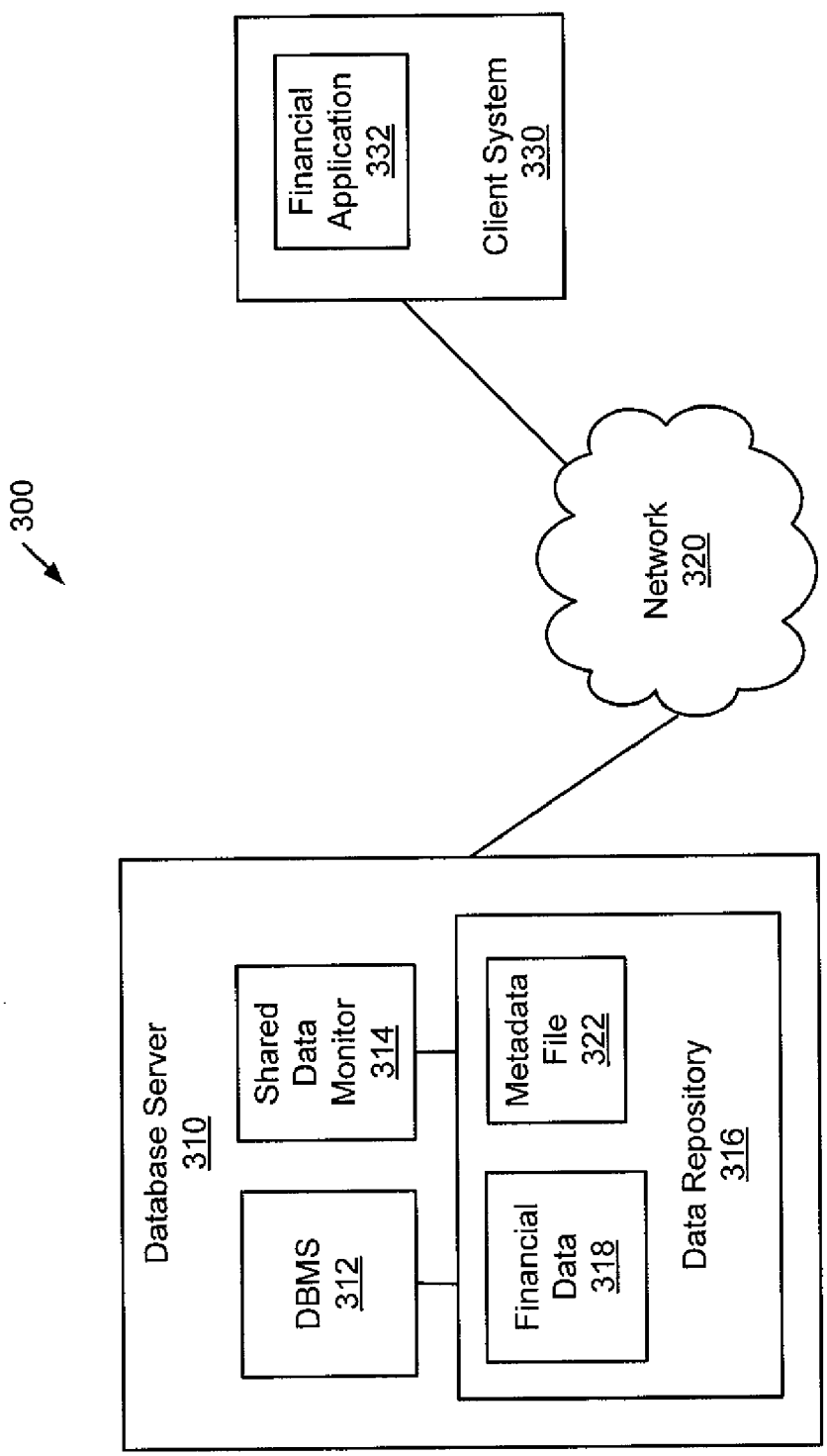
FIG. 3 shows an example of directing local data access from a remote system in accordance with one or more embodiments of the invention.

FIG. 3 shows an example of directing local data access from a remote system in accordance with one or more embodiments of the invention. In the example, a database server (310) (i.e., a local system) and a client system (330) (i.e., a remote system) are operatively connected by a network (320). The database server (310) includes UNIX-based operating system and file system and the client system includes a WINDOWS based operating system and file system. The database server also includes database management software (DBMS) (312) (i.e., a data access application), a shared data monitor (314), and a data repository (316). The data repository (316) stores financial data (318) that is shared with a financial application (332) on the client system (330) and a metadata file (322) associated with the financial data (318). The metadata file (322) includes local access path information for the financial data (318) in the form of a UNIX pathname for a directory in the file system that contains the financial data (318) and the name of the system where the directory exists.

In the example, the financial application (332) is opening a file on the client system (330) using a mapped drive (not shown). The financial application (332) cannot initially tell whether the mapped drive is local to the client system (330) or a remote drive on the database server (310). If the mapped drive is on the database server (310), the financial application (332) would initially have no knowledge of the local access path information of the database server (310). For example, the financial application (332) may be opening a file, such as E:\MyCompanyFile.qbw, and cannot initially tell whether file is local to the client system (330). The financial application (332) then looks for a metadata file associated with this path. If one is found (e.g., the metadata file (322)), the financial application (332) may then read the metadata file (322) to get additional information about the local access path. Using information from the metadata file (322), the financial application (332) obtains the local access path information needed to pass to the database management software (DBMS) (312). Checking the existence of the metadata file (322) allows the financial application (332) to determine whether the file is not on the client system (330). Including the name of the system in the metadata file (322) allows confirmation that the metadata file is not a stale copy created on a different system. Accordingly, the financial application (332) may direct the database management software (DBMS) (312) to open that file in a more efficient manner.

In this example, the shared data monitor (314) may be a process running in the UNIX-based operating system of the database server (310). This process monitors directories in the file system of the database server (310) to detect when the financial application (332) creates a directory containing the financial data (318). When this process recognizes that new directory has been created by the financial application (332), the process creates the metadata file (322) associated with the directory containing the financial data (318) and provides a UNC pathname for the metadata file (322) to the financial application (332).

A user of the financial application (332) may request the use of the financial data (318) by the financial application (332) using a dialog provided by the financial application (332). For example, the user may use a "File Open Dialog" to select the financial data (318) from a list of available financial data. The financial application (332) may then obtain the local access path information for the financial data (318) from the metadata file (322) on the database server (310). More specifically, the financial application (332) may use the UNC pathname of the metadata file (322) to open and read the metadata vile (322). The financial application (332) then uses the local access path information to generate a UNIX pathname for the financial data (318). The financial application (332) may then use an open database connection to communicate with the DBMS (312), passing the generated pathname to the DBMS (312) so that the DBMS (312) may open and access the financial data (318) as a local file to perform any data operations requested by the financial application (332). By opening the financial data (318) as a local file, the DBMS (310) has faster and more direct access to the financial data (318) than would be possible if a UNC pathname for the financial data (318) was provided by the financial application (332) instead.

Figure 4:
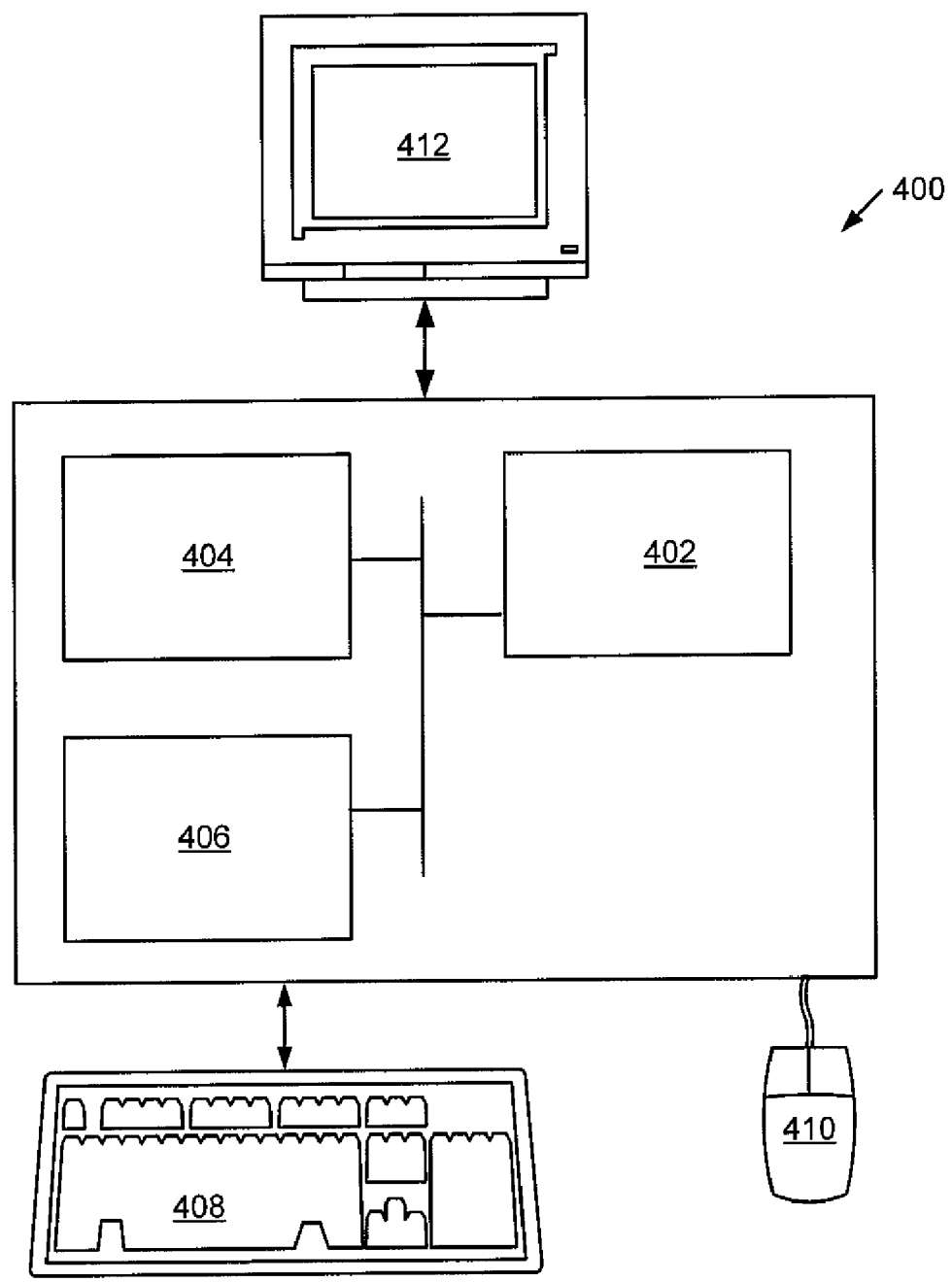
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for directing data access in a local system, comprising:

identifying, by a remote application, a remote access path of a shared data resource stored in the local system, wherein the remote access path is used to access the shared resource from outside the local system;

obtaining, by the remote application and from the local system, sharing metadata associated with the remote access path, wherein the sharing metadata comprises a local access path of the shared data resource, wherein the local access path is used to access the shared data resource exclusively from within the local system;

extracting, by the remote application, the local access path of the shared data resource from the sharing metadata;

requesting, by the remote application, that a data access application on the local system perform a data operation on the shared data resource, wherein the remote application provides the local access path to the data access application; and receiving the result of the data operation from the data access application, wherein the data access application performs the data operation on the shared data resource using the local access path.

2. The method of claim 1,
wherein the local access path comprises a local pathname for the shared data resource.

3. The method of claim 1,
wherein another remote access path for a metadata file storing the sharing metadata is provided to the remote application by the local system.

4. The method of claim 1, wherein the sharing metadata is created when the shared data resource is created.

5. The method of claim 1, wherein the local system is a UNIX-based system and the remote system is a WINDOWS-based system.

6. The method of claim 1, wherein the remote application is a financial application and the data access application is a database management system.

7. A method for directing data access in a local system, comprising:

identifying a remote access path of a shared data resource stored in the local system, wherein the remote access path is used to access the shared resource from outside the local system;

providing sharing metadata associated with the remote access path to a remote application, wherein the sharing metadata comprises a local access path of the shared data resource, wherein the local access path is used to access the shared data resource exclusively from within the local system;

receiving, from the remote application, a request to perform a data operation on the shared data resource, wherein the request comprises the local access path of the shared data resource generated extracted from the sharing metadata by the remote application;

performing the data operation on the shared data resource using the local access path; and providing the result of the data operation to the remote application.

8. The method of claim 7, further comprising:
detecting the shared data resource; and
responsive to the detecting, storing the sharing metadata for the shared data resource.

9. The method of claim 8, wherein detecting the shared data resource comprises at least one selected from a group consisting of monitoring creation of shared data resources and scanning a data repository for shared data resources.

10. The method of claim 8, further comprising:
providing another remote access path for a metadata file storing the sharing metadata to the remote application.

11. The method of claim 7, wherein the local system is a UNIX-based system and the remote system is a WINDOWS-based system.

12. The method of claim 7, wherein the remote application is a financial application and the shared data resource is financial data.

13. A system for directing data access in a local system by a remote system, comprising:

a shared data resource stored on the local system, wherein the shared data resource is accessed by a remote application using a remote access path from outside of the local system;

a sharing metadata associated with the remote access path and comprising a local access path of the shared data resource, wherein the local access path is used to access the shared data resource exclusively from within the local system; and a data access application executing on a processor of the local system, wherein the data access application configured to perform a plurality of data operations on the shared data resource, wherein the remote application is comprises instructions stored in memory on the remote system, the instructions when executed by a processor on the remote system comprises functionalities to:

identify the remote access path for accessing the shared data resource;

obtain the sharing metadata from the local system in response to identifying the remote access path;

extract the local access path of the shared data resource from the sharing metadata;

request that the data access application perform a data operation of the plurality of data operations on the shared data resource, wherein the remote application provides the local access path to the data access application; and receive the result of the data operation from the data access application.

14. The system of claim 13, further comprising:
a shared data monitor configured to detect the shared data resource and to store the sharing metadata responsive to detecting the shared data resource.

15. The system of claim 14, wherein the shared data monitor is further configured to provide another remote access path for a metadata file storing the sharing metadata to the remote application.

16. The system of claim 14, wherein the shared data monitor is configured to detect the shared data resource by at least one selected from a group consisting of monitoring creation of shared data resources and scanning a data repository for shared data resources.

17. The system of claim 13, wherein the local system is a UNIX-based system and the remote system is a WINDOWS-based system.

18. The system of claim 13, wherein the remote application is a financial application and the shared data resource is financial data.

19. A non-transitory computer readable medium comprising executable instructions for directing data access in a local system, the instructions when executed by a processor of a remote system comprising functionality to:
   identify a remote access path of a shared data resource stored in the local system, wherein the remote access path is used to access the shared resource from outside the local system;
   obtain sharing metadata associated with the remote access path from the local system, wherein the sharing metadata comprises a local access path of the shared data resource, wherein the local access path is used to access the shared data resource exclusively from within the local system;
   extract the local access path of the shared data resource from the sharing metadata for providing to a data access application on the local system;
   request that the data access application perform a data operation on the shared data resource using the local access path; and
   receive the result of the data operation from the data access application, wherein the data access application performs the data operation on the shared data resource using the local access path.

20. The computer readable medium of claim 19,
   wherein the local access path comprises a local pathname for the shared data resource.

21. The computer readable medium of claim 19, wherein another remote access path for a metadata file storing the sharing metadata is provided to the remote system by the local system.

22. A non-transitory computer readable medium comprising executable instructions for directing data access in a local system, the instructions when executed by a processor of a remote system comprising functionality to:
   identify a remote access path of a shared data resource stored in the local system, wherein the remote access path is used to access the shared resource from outside the local system;
   providing sharing metadata associated with the remote access path to a remote application, wherein the sharing metadata comprises a local access path of the shared data resource, wherein the local access path is used to access the shared data resource exclusively from within the local system;
   receive, from the remote application, a request to perform a data operation on the shared data resource, wherein the request comprises the local access path of the shared data resource extracted from the sharing metadata by the remote application;
   perform the data operation on the shared data resource using the local access path; and
   provide the result of the data operation to the remote application.

23. The computer readable medium of claim 22, further comprising executable instructions to:
   detect the shared data resource; and
   responsive to the detecting, store the sharing metadata for the shared data resource.

24. The computer readable medium of claim 22, wherein the executable instructions to detect the shared data resource comprise executable instruction for at least one selected from a group consisting of monitoring creation of shared data resources and scanning a data repository for shared data resource.

* * * * *

UNITED STATES PATENT AND TRADEMARK OFFICE
CERTIFICATE OF CORRECTION

| | | |
|---|---|---|
| PATENT NO. | : 7,904,447 B1 | |
| APPLICATION NO. | : 12/018075 | |
| DATED | : March 8, 2011 | |
| INVENTOR(S) | : Kent S. Russell et al. | |

It is certified that error appears in the above-identified patent and that said Letters Patent is hereby corrected as shown below:

In Claim 7, Column 10 (line 1), "generated" should be deleted.

In Claim 13, Column 10 (line 38), --is-- should be added after "application".

In Claim 13, Column 10 (line 41), "is" should be deleted.

Signed and Sealed this
Tenth Day of May, 2011

David J. Kappos
*Director of the United States Patent and Trademark Office*